(12) United States Patent
Hawkins et al.

(10) Patent No.: US 8,768,839 B1
(45) Date of Patent: Jul. 1, 2014

(54) MUTUAL FUND CUSTOMER IDENTIFICATION

(75) Inventors: Charles S. Hawkins, Solvang, CA (US); Marci M. Morgan, Ardmore, PA (US); Pamela M. Mudrick, Rutledge, PA (US)

(73) Assignee: BNY Mellon Distributors Holdings Inc., Wilmington, DE (US)

( * ) Notice: Subject to any disclaimer, the term of this patent is extended or adjusted under 35 U.S.C. 154(b) by 0 days.

(21) Appl. No.: 13/278,549

(22) Filed: Oct. 21, 2011

Related U.S. Application Data

(63) Continuation of application No. 12/117,387, filed on May 8, 2008, now abandoned, which is a continuation of application No. 11/237,331, filed on Sep. 28, 2005, now abandoned.

(60) Provisional application No. 60/613,672, filed on Sep. 28, 2004.

(51) Int. Cl.
  *G06Q 40/00* (2012.01)
(52) U.S. Cl.
  USPC .......................................................... 705/44
(58) Field of Classification Search
  USPC .......................................................... 705/44
  See application file for complete search history.

(56) References Cited

U.S. PATENT DOCUMENTS

| 7,221,749 | B2 * | 5/2007 | Chiczewski et al. ...... 379/201.01 |
| 2003/0135426 | A1 * | 7/2003 | Lux ................................. 705/26 |
| 2004/0078321 | A1 * | 4/2004 | Lawrence ...................... 705/38 |
| 2007/0100745 | A1 * | 5/2007 | Keiser et al. .................... 705/38 |

FOREIGN PATENT DOCUMENTS

JP  09171589 A  *  6/1997

OTHER PUBLICATIONS

Liability At Law and Insurance Against It Sawyer, E W. Journal of Risk and Insurance (pre-1986) 4.1 (Mar. 1937):72.*
Commercial Banks and Competitive Trends in Consumer Instalment Financing Mors, Wallace P. The Journal of Business of the University of Chicago (pre-1986) 21.3 (Jul. 1948): 133.*
The economic and social conditions in the ghetto, together with the aspirations of the Jews as described by ghetto writters Marie Thaddea de Sion, Sister. University of Ottawa (Canada), ProQuest, UMI Dissertations Publishing, 1945. DC53564.*

* cited by examiner

*Primary Examiner* — Hani M Kazimi
*Assistant Examiner* — Hatem M Ali
(74) *Attorney, Agent, or Firm* — K&L Gates LLP

(57) ABSTRACT

A computer-assisted method is provided for verifying identifying data of a customer of a financial institution. The method includes receiving the identifying data of the customer in a customer processing system of a customer identification program; applying at least one of a customer matrix or a scenario matrix to the customer identifying data for determining applicability of the customer identification program to the customer; searching at least one record of the customer identifying data with at least one government list function; and, communicating at least one record of the customer identifying data to at least one verification vendor.

18 Claims, 34 Drawing Sheets

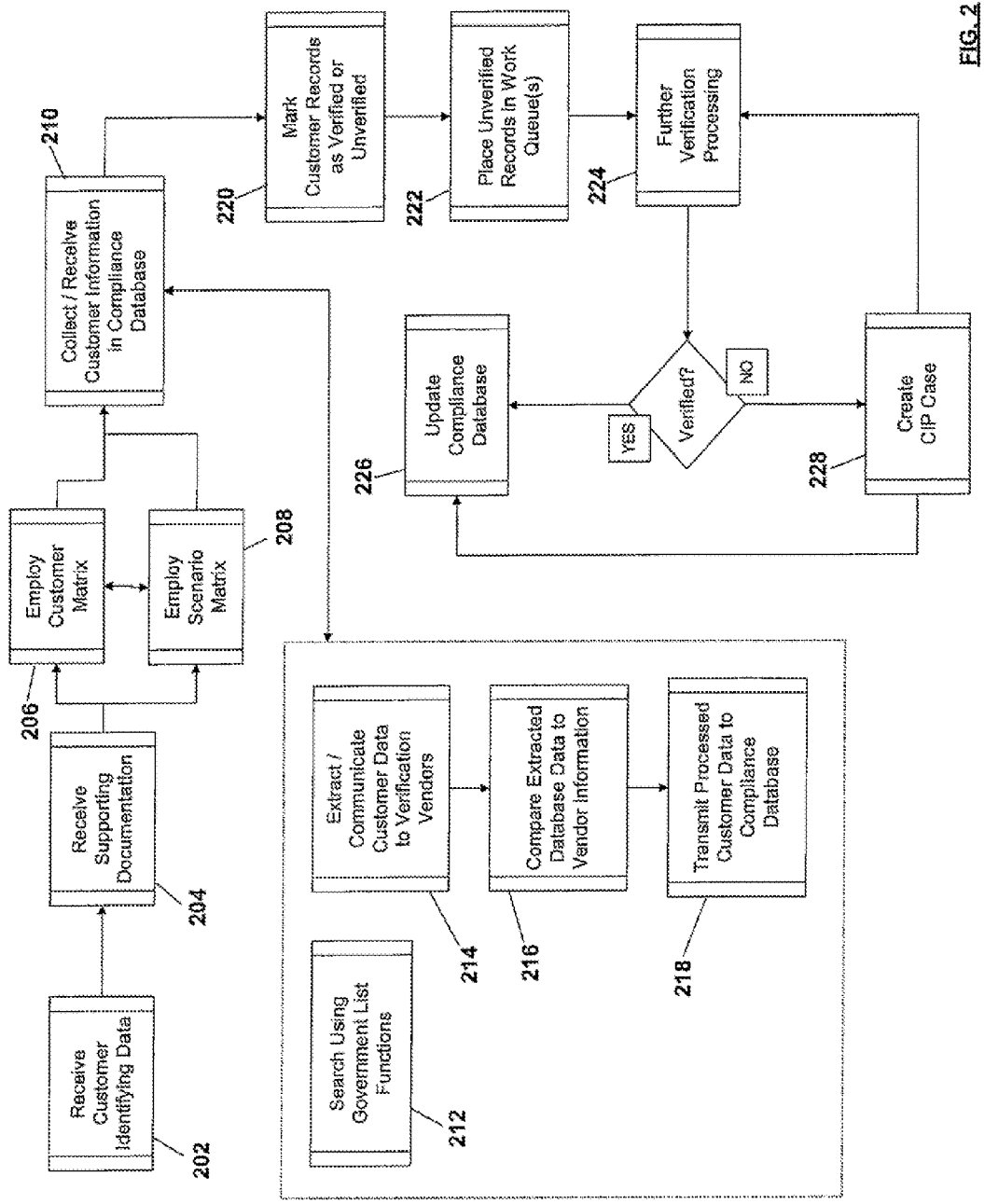

FIG. 3A1

PFPC TA CIP CUSTOMER MATRIX

| Account Category | Account Type | Does CIP Apply? | Who Is Customer? | Information Recommended to be Obtained in Addition to Customer's Required Data Elements | Recommended Documents to be Obtained from Customer When Application Submitted | Comments |
|---|---|---|---|---|---|---|
| Individual | Male SH | Yes | Individual | | | |
| | Female SH | Yes | Individual | | | |
| | TOD Male | Yes | Individual | | | TOD beneficiary does not need to be verified upon account opening; beneficiary will be verified when/if account assets are transferred to an account in beneficiary's name |
| | TOD Female | Yes | Individual | | | TOD beneficiary does not need to be verified upon account opening; beneficiary will be verified when/if account assets are transferred to an account in beneficiary's name |
| | Life Tenant/Usufructuary - Individual | Yes | Individual | | | Remainderman/Naked Owner(s) will be verified when a new account is opened after end of life tenancy |
| Joint | JTWROS | Yes | All Individuals listed in registration | | | |
| | Tenants in Common | Yes | All Individuals listed in registration | | | |

FIG. 3A2

| | | | | |  |
|---|---|---|---|---|---|
| | Tenants by Entirety | Yes | Husband and Wife | | |
| | Community Property | Yes | Husband and Wife | | |
| | Community Property WROS | Yes | Husband and Wife | | |
| | TOD Joint Tenant | Yes | All Individuals listed in registration | | TOD beneficiary does not need to be verified upon account opening; beneficiary will be verified when/if account assets are transferred to an account in beneficiary's name |
| | Life Tenants/Usufructuary - Joint | Yes | All Individuals listed in registration | | Remainderman/Naked Owner(s) will be verified when a new account is opened after end of life tenancy |
| Businesses | Sole Proprietorship | Yes | The Sole Proprietor* | | *Because the sole proprietorship is not a separate legal entity from the sole proprietor, the sole proprietor will be verified |
| 350 | Partnership | Yes | The Partnership | Partnership - See Documentation Notes | Additional verification of General Partners may be performed |
| | | | | Data Elements of the General Partners (on application) | |
| | Corporate | No/ Yes* | The Corporation | Corporate - See Documentation Notes | *Public corps. are not distinguishable from private corps. All corps. will be subject to CIP (exception: corps. in MC's on OEP) - expect public corps. will quickly verified by non-doc process Add'l verification of corp. officers may also be performed |
| | | | | Data Elements of Corporate Officers who are authorized traders (on application) | |

FIG. 3B1

PFPC TA CIP CUSTOMER MATRIX

| Account Category | Account Type | Does CIP Apply? | Who Is Customer? | Information Recommended to be Obtained in Addition to Customer's Required Data Elements | Recommended Documents to be Obtained from Customer When Application Submitted | Comments |
|---|---|---|---|---|---|---|
| | Unincorporated Businesses | Yes | The Business | Data Elements of authorized traders (on application) | Other - See Documentation Notes | Additional verification of the business' officers may be performed |
| Financial Entities | Financial Organizations | Yes* | The Organization | Data Elements of authorized traders (on application) | Other - See Documentation Notes | *Some financial organizations may not be regulated financial institutions excluded from the definition of Customer. Therefore, all financial organizations will be subject to the CIP process. |
| | Banks (domestic) | No/ Yes* | | | | *Some banks may not be regulated financial institutions excluded from the definition of Customer under the CIP rule. Therefore, all banks will be subject to the CIP process when opening first account on/after 10/1/03. |
| | Banks (foreign) | Yes | The Bank | Data Elements of authorized traders (on application) | Foreign and Other - See Documentation Notes | Additional verification of the entity's officers may be performed |
| | Brokers and Dealers (domestic) | No/ Yes* | | | | *Some broker/dealers may not be regulated financial institutions excluded from the definition of Customer under the CIP rule. Therefore, all broker/dealers will be subject to the CIP process when opening first account on/after 10/1/03. |
| | Brokers and Dealers (foreign) | Yes | The Broker/Dealer | Data Elements of authorized traders (on application) | Foreign and Other - See Documentation Notes | Additional verification of the entity's officers may be performed |

| | | | |
|---|---|---|---|
| Insurance Company (domestic) | No/ Yes* | | | *Some insurance companies may not be regulated financial institutions excluded from the definition of Customer under the CIP rule. Therefore, all insurance companies will be subject to the CIP process when opening first account on/after 10/1/03. |
| Insurance Company (foreign) | Yes | The Insurance Company | Data Elements of authorized traders (on application) | Foreign and Other - See Documentation Notes | Additional verification of the entity's officers may be performed |
| Credit Unions (domestic) | No/ Yes* | | | | *Some credit unions may not be regulated financial institutions excluded from the definition of Customer under the CIP rule. Therefore, all credit unions will be subject to the CIP process when opening first account on/after 10/1/03. |
| Investment Companies (domestic) | No/ Yes* | | | | *Some investment companies may not be regulated financial institutions excluded from the definition of Customer under the CIP rule. Therefore, all investment companies will be subject to the CIP process when opening first account on/after 10/1/03. |
| Investment Companies (foreign) | Yes | The Investment Company | Data Elements of authorized traders (on application) | Foreign and Other - See Documentation Notes | Additional verification of the entity's officers may be performed |
| Investment Club | Yes | The Investment Club | Data Elements of authorized traders (on application) | Partnership or Other, whichever applies - See Documentation Notes | Additional verification of authorized traders may be performed |

FIG. 3B3

| Organi-zations | | | | | |
|---|---|---|---|---|---|
| | Governmental Organization | Yes | The Organization | Data Elements of authorized traders (on application) | Other - See Documentation Notes | Additional verification of authorized traders may be performed |
| | Foreign Gov't/International Organization | Yes | The Organization | Data Elements of authorized traders (on application) | Other - See Documentation Notes | Additional verification of authorized traders may be performed |
| | Religious Organization | Yes | The Organization | Data Elements of authorized traders (on application) | Other - See Documentation Notes | Additional verification of authorized traders may be performed |

FIG. 3C1

PFPC TA CIP CUSTOMER MATRIX

| Account Category | Account Type | Does CIP Apply? | Who Is Customer? | Information Recommended to be Obtained in Addition to Customer's Required Data Elements | Recommended Documents to be Obtained from Customer When Application Submitted | Comments |
|---|---|---|---|---|---|---|
| | Fraternal Organization | Yes | The Organization | Data Elements of authorized traders (on application) | Other - See Documentation Notes | Additional verification of authorized traders may be performed |
| | Charitable/Welfare Organization | Yes | The Organization | Data Elements of authorized traders (on application) | Other - See Documentation Notes | Additional verification of authorized traders may be performed |
| | Unincorporated Associations | Yes | The Association | Data Elements of authorized traders (on application) | Other - See Documentation Notes | Additional verification of authorized traders may be performed |
| | Unions | Yes | The Union | Data Elements of authorized traders (on application) | Other - See Documentation Notes | Additional verification of authorized traders may be performed |
| | Other Non-Profit Organization/Entity | Yes | The Organization | Data Elements of authorized traders (on application) | Corporate, Partnership, or Other, whichever applies - See Documentation Notes | Additional verification of authorized traders may be performed |

| Other Entities | | | | | |
|---|---|---|---|---|---|
| Libraries | Yes | The Library | Data Elements of authorized traders (on application) | Corporate, Partnership, or Other, whichever applies - See Documentation Notes | Additional verification of authorized traders may be performed |
| Hospitals | Yes | The Hospital | Data Elements of authorized traders (on application) | Corporate, Partnership, or Other, whichever applies - See Documentation Notes | Additional verification of authorized traders may be performed |
| Cemeteries | Yes | The Cemetery | Data Elements of authorized traders (on application) | Other - See Documentation Notes | Additional verification of authorized traders may be performed |
| Educational Institutions | Yes | The Institution | Data Elements of authorized traders (on application) | Corporate, Partnership, or Other, whichever applies - See Documentation Notes | Additional verification of authorized traders may be performed |
| Homes/Asylums Sanitariums | Yes | The Institution | Data Elements of authorized traders (on application) | Corporate, Partnership, or Other, whichever applies - See Documentation Notes | Additional verification of authorized traders may be performed |

FIG. 3C3

| Power of Attorney | | | | |
|---|---|---|---|---|
| | Bank as Agent (POA) for Corporation | No/ Yes* | Both Agent (POA) and Account Owner | | Other - Certified copy of document appointing the POA | *Some banks may not be regulated financial institutions excluded from the definition of Customer under the CIP rule. Therefore, all banks will be subject to the CIP process when opening first account on/after 10/1/03. |
| | Bank as Agent (POA) for Individual | No/ Yes* | Both Agent (POA) and Account Owner | | Other - Certified copy of document appointing the POA | *Some banks may not be regulated financial institutions excluded from the definition of Customer under the CIP rule. Therefore, all banks will be subject to the CIP process when opening first account on/after 10/1/03. |
| | Individual as Agent (POA) | Yes | Both Agent (POA) and Account Owner | | Other - Certified copy of document appointing the POA | Generally, both the POA and the Account Owner are authorized to act on the account. Therefore, both are Customers and both need to be verified. |
| Fiduciary | Individual(s) as Fiduciary (Conservator, Custodian or Guardianship) | Yes | The Fiduciary | | Other - Certified copy of document appointing the Fiduciary | Beneficiary does not need to be verified |

FIG. 3D1

PFPC TA CIP CUSTOMER MATRIX

| Account Category | Account Type | Does CIP Apply? | Who Is Customer? | Information Recommended to be Obtained in Addition to Customer's Required Data Elements | Recommended Documents to be Obtained from Customer When Application Submitted | Comments |
|---|---|---|---|---|---|---|
| | Bank as Fiduciary (Conservator, Custodian or Guardian) | No/ Yes* | The Fiduciary | | Other - Certified copy of documents appointing the Fiduciary | *Some banks may not be regulated financial institutions excluded from the definition of Customer under the CIP rule. Therefore, all banks will be subject to the CIP process when opening first account on/after 10/1/03. |
| | Nominees for Banks and Trusts | Yes | The Nominee(s) | | Corporate, Partnership, or Other, whichever applies – See Documentation Notes | |
| | Uniform Gifts to Minors Act (UGMA)/Uniform Transfers to Minors Act (UTMA) | Yes | The Custodian | | *If the Custodian is an individual* - no additional documentation required. *If the Custodian is not an individual* - Corporate, Partnership, or Other, whichever applies -- See Documentation Notes | Minor does not need to be verified upon opening of UGMA/UTMA account. However, Minor will be verified once account is re-registered in Minor's name upon attaining the applicable state's age of majority. |

| | | | | |
|---|---|---|---|---|
| Trust - Individual(s) as Trustee(s) | Yes | The Trust | Data Elements of Trustee(s) (on application) | Other - Certified copy of page of Trust document that includes the name of the Trust and page(s) that contain signatures of Trustee(s) | Additional verification of Trustee(s) may be performed |
| Trust - Bank as Trustee | Yes | The Trust | Data Elements of Trustee(s) (on application) | Other - Certified copy of page of Trust document that includes the name of the Trust and page(s) that contain signatures of Trustee(s) | Additional verification of Trustee(s) may be performed |
| Estate - Individual(s) as Executor | Yes | The Estate | Data Elements of Executor(s) (on application) | Other - Certified copy of document appointing the Fiduciary | Additional verification of Executor(s) may be performed |
| Estate - Bank as Executor | Yes | The Estate | Data Elements of Executor (on application) | Other - Certified copy of document appointing the Fiduciary | Additional verification of Executor may be performed |

FIG. 3D3

| Retirement - Fund Sponsored | | | | | |
|---|---|---|---|---|---|
| IRA - (Fund-Sponsored) | Yes | | Individual | | Beneficiary does not need to be verified upon account opening; beneficiary will be verified when/if account assets are transferred to an account in beneficiary's name |
| Roth IRA - (Fund-Sponsored) | Yes | | Individual | | Beneficiary does not need to be verified upon account opening; beneficiary will be verified when/if account assets are transferred to an account in beneficiary's name |
| Roth IRA - Conversion (Fund-Sponsored) | Yes | | Individual | | Beneficiary does not need to be verified upon account opening; beneficiary will be verified when/if account assets are transferred to an account in beneficiary's name |
| Rollover IRA - (Fund-Sponsored) | Yes | | Individual | | Beneficiary does not need to be verified upon account opening; beneficiary will be verified when/if account assets are transferred to an account in beneficiary's name |
| SEP IRA - (Fund-Sponsored) | Yes | | Individual | | Beneficiary does not need to be verified upon account opening; beneficiary will be verified when/if account assets are transferred to an account in beneficiary's name |

FIG. 3E1

PFPC TA CIP CUSTOMER MATRIX

| Account Category | Account Type | Does CIP Apply? | Who Is Customer? | Information Recommended to be Obtained in Addition to Customer's Required Data Elements | Recommended Documents to be Obtained from Customer When Application Submitted | Comments |
|---|---|---|---|---|---|---|
| | SAR SEP IRA - (Fund-Sponsored) | Yes | Individual | | | Beneficiary does not need to be verified upon account opening; beneficiary will be verified when/if account assets are transferred to an account in beneficiary's name |
| | Simple IRA - Non DFI - (Fund-Sponsored) | Yes | Individual | | | Beneficiary does not need to be verified upon account opening; beneficiary will be verified when/if account assets are transferred to an account in beneficiary's name |
| | Simple IRA - DFI - (Fund-Sponsored) | Yes | Individual | | | Beneficiary does not need to be verified upon account opening; beneficiary will be verified when/if account assets are transferred to an account in beneficiary's name |
| | Pension Plan - (Fund-Sponsored) | No | | | | ERISA exclusion applies |
| | Employee Benefit Plan - (Fund-Sponsored) | No | | | | ERISA exclusion applies |
| | Defined Benefit Plan - (Fund-Sponsored) | No | | | | ERISA exclusion applies |

| A | | | B | C |
|---|---|---|---|---|
| Money Purchase - (Fund-Sponsored) | No/ Yes* | Individual** | | *Because some Money Purchase Plans are ERISA and some are not, ALL Money Purchase Plans will be subject to the CIP process; clients must provide instruction if they have Money Purchase Plans that should not be subject to CIP. **Because the Individual is the Customer if the Plan is non-ERISA (one participant only), the Individual will be considered to be the Customer for CIP purposes. |
| Profit Sharing - (Fund-Sponsored) | No/ Yes* | Individual** | | *Because some Profit Sharing Plans are ERISA and some are not, ALL Profit Sharing Plans will be subject to the CIP process; clients must provide instruction if they have Profit Sharing Plans that should not be subject to CIP. **Because the Individual is the Customer if the Plan is non-ERISA (one participant only), the Individual will be considered to be the Customer for CIP purposes. |
| 401(k) - (Fund-Sponsored) | No | | | ERISA exclusion applies |
| Cash Comp 401(k) - (Fund-Sponsored) | No | | | ERISA exclusion applies |
| Simple 401(k) - (Fund-Sponsored) | No | | | ERISA exclusion applies |
| 403(b)(7) - (Fund-Sponsored) | No/ Yes* | Individual/ Entity seeking to open account | If Customer is an Entity, Data Elements of authorized traders (on application) | Other - Certified copy of 1st and signature pages of Plan document | *Because some 403(b)(7) Plans are ERISA and some are not, ALL 403(b)(7)s will be subject to the CIP process; clients must provide instruction if they have ERISA 403(b)(7)s that should not be subject to CIP |
| TSA 403(b) - (Fund-Sponsored) | No | | | ERISA exclusion applies |
| Target Benefit Plan - (Fund-Sponsored) | No | | | ERISA exclusion applies |

FIG. 3F1

PFPC TA CIP CUSTOMER MATRIX

| Account Category | Account Type | Does CIP Apply? | Who Is Customer? | Information Recommended to be Obtained in Addition to Customer's Required Data Elements | Recommended Documents to be Obtained from Customer When Application Submitted | Comments |
|---|---|---|---|---|---|---|
| | Thrift Plan - (Fund-Sponsored) | No | | | | ERISA exclusion applies |
| | 457 Plan - (Fund-Sponsored) | No/Yes* | Individual/Entity seeking to open account | If Customer is an Entity, Data Elements of authorized traders (on application) | Other - Certified copy of 1st and signature pages of Plan document | *Because some 457 Plans are ERISA and some are not, ALL 457 accounts will be subject to the CIP process; clients must provide instruction if they have ERISA 457s that should not be subject to CIP |
| Retirement - Not Fund Sponsored | IRA - (Not Fund Sponsored) | Yes | The Custodian | Data Elements of authorized traders (on application) | Other - Certified Copy of 1st and signature pages of IRA Agreement | Because the account is not sponsored by a PFPC fund client, the Custodian (not the individual participant) is the Customer for CIP purposes. |
| | Roth IRA - (Not Fund Sponsored) | Yes | The Custodian | Data Elements of authorized traders (on application) | Other - Certified Copy of 1st and signature pages of IRA Agreement | Because the account is not sponsored by a PFPC fund client, the Custodian (not the individual participant) is the Customer for CIP purposes. |
| | Roth IRA - Conversion (Not Fund-Sponsored) | Yes | The Custodian | Data Elements of authorized traders (on application) | Other - Certified Copy of 1st and signature pages of IRA Agreement | Because the account is not sponsored by a PFPC fund client, the Custodian (not the individual participant) is the Customer for CIP purposes. |
| | Rollover IRA - (Not Fund-Sponsored) | Yes | The Custodian | Data Elements of authorized traders (on application) | Other - Certified Copy of 1st and signature pages of IRA Agreement | Because the account is not sponsored by a PFPC fund client, the Custodian (not the individual participant) is the Customer for CIP purposes. |
| | SEP IRA - (Not Fund-Sponsored) | Yes | The Custodian | Data Elements of authorized traders (on application) | Other - Certified Copy of 1st and signature pages of IRA Agreement | Because the account is not sponsored by a PFPC fund client, the Custodian (not the individual participant) is the Customer for CIP purposes. |

FIG. 3F2

| | | | | |
|---|---|---|---|---|
| SAR SEP IRA - (Not Fund-Sponsored) | Yes | The Custodian | Data Elements of authorized traders (on application) | Other - Certified Copy of 1st and signature pages of IRA Agreement | Because the account is not sponsored by a PFPC fund client, the Custodian (not the individual participant) is the Customer for CIP purposes |
| Simple IRA - Non DFI - (Not Fund-Sponsored) | Yes | The Custodian | Data Elements of authorized traders (on application) | Other - Certified Copy of 1st and signature pages of IRA Agreement | Because the account is not sponsored by a PFPC fund client, the Custodian (not the individual participant) is the Customer for CIP purposes |
| Simple IRA - DFI - (Not Fund-Sponsored) | Yes | The Custodian | Data Elements of authorized traders (on application) | Other - Certified Copy of 1st and signature pages of IRA Agreement | Because the account is not sponsored by a PFPC fund client, the Custodian (not the individual participant) is the Customer for CIP purposes |
| Pension Plan - (Not Fund-Sponsored) | Yes* | The Plan | Data Elements of authorized traders (on application) | Other - Certified copy of 1st and signature pages of Plan document | *Because it cannot be determined whether the ERISA exclusion applies if the Plan is not sponsored by a PFPC fund client, all such accounts will be subject to the CIP process |
| Employee Benefit Plan (Not Fund-Sponsored) | Yes* | The Plan | Data Elements of authorized traders (on application) | Other - Certified copy of 1st and signature pages of Plan document | *Because it cannot be determined whether the ERISA exclusion applies if the Plan is not sponsored by a PFPC fund client, all such accounts will be subject to the CIP process |
| Defined Benefit Plan (Not Fund-Sponsored) | Yes* | The Plan | Data Elements of authorized traders (on application) | Other - Certified copy of 1st and signature pages of Plan document | *Because it cannot be determined whether the ERISA exclusion applies if the Plan is not sponsored by a PFPC fund client, all such accounts will be subject to the CIP process |
| Money Purchase (Not Fund-Sponsored) | Yes* | The Plan | Data Elements of authorized traders (on application) | Other - Certified copy of 1st and signature pages of Plan document | *Because it cannot be determined whether the ERISA exclusion applies if the Plan is not sponsored by a PFPC fund client, all such accounts will be subject to the CIP process |
| Profit Sharing (Not Fund-Sponsored) | Yes* | The Plan | Data Elements of authorized traders (on application) | Other - Certified copy of 1st and signature pages of Plan document | *Because it cannot be determined whether the ERISA exclusion applies if the Plan is not sponsored by a PFPC fund client, all such accounts will be subject to the CIP process |

FIG. 3G1

PFPC TA CIP CUSTOMER MATRIX

| Account Category | Account Type | Does CIP Apply? | Who Is Customer? | Information Recommended to be Obtained in Addition to Customer's Required Data Elements | Recommended Documents to be Obtained from Customer When Application Submitted | Comments |
|---|---|---|---|---|---|---|
| | 401(k) - (Not Fund-Sponsored) | Yes* | The Plan | Data Elements of authorized traders (on application) | Other - Certified copy of 1st and signature pages of Plan document | *Because it cannot be determined whether the ERISA exclusion applies if the Plan is not sponsored by a PFPC fund client, all such accounts will be subject to the CIP process |
| | Cash Comp 401(k) (Not Fund-Sponsored) | Yes* | The Plan | Data Elements of authorized traders (on application) | Other - Certified copy of 1st and signature pages of Plan document | *Because it cannot be determined whether the ERISA exclusion applies if the Plan is not sponsored by a PFPC fund client, all such accounts will be subject to the CIP process |
| | Simple 401(k) (Not Fund-Sponsored) | Yes* | The Plan | Data Elements of authorized traders (on application) | Other - Certified copy of 1st and signature pages of Plan document | *Because it cannot be determined whether the ERISA exclusion applies if the Plan is not sponsored by a PFPC fund client, all such accounts will be subject to the CIP process |
| | 403(b)(7) - (Not Fund-Sponsored) | Yes* | Individual/ Entity seeking to open account | If Customer is an Entity, Data Elements of authorized traders (on application) | Other - Certified copy of 1st and signature pages of Plan document | *Because it cannot be determined whether the ERISA exclusion applies if the Plan is not sponsored by a PFPC fund client, all such accounts will be subject to the CIP process |
| | TSA 403(b) - (Not Fund-Sponsored) | Yes* | The Plan | Data Elements of authorized traders (on application) | Other - Certified copy of 1st and signature pages of Plan document | *Because it cannot be determined whether the ERISA exclusion applies if the Plan is not sponsored by a PFPC fund client, all such accounts will be subject to the CIP process |
| | Target Benefit Plan (Not Fund-Sponsored) | Yes* | The Plan | Data Elements of authorized traders (on application) | Other - Certified copy of 1st and signature pages of Plan document | *Because it cannot be determined whether the ERISA exclusion applies if the Plan is not sponsored by a PFPC fund client, all such accounts will be subject to the CIP process |

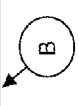

FIG. 3G2

|  |  |  |  |  | |
|---|---|---|---|---|---|
|  | Thrift Plan - (Not Fund-Sponsored) | Yes* | The Plan | Data Elements of authorized traders (on application) | Other - Certified copy of 1st and signature pages of Plan document | *Because it cannot be determined whether the ERISA exclusion applies if the Plan is not sponsored by a PFPC fund client, all such accounts will be subject to the CIP process |
|  | 457 Plan - (Not Fund-Sponsored) | Yes* | Individual/ Entity seeking to open account | If Customer is an Entity, Data Elements of authorized traders (on application) | Other - Certified copy of 1st and signature pages of Plan document | *Because it cannot be determined whether the ERISA exclusion applies if the Plan is not sponsored by a PFPC fund client, all such accounts will be subject to the CIP process |
| Educational Investments | 529 Plans - Individual registrant(s) | No/ Yes* | Individual Account Owner | ---------- |  | *Although the 529 Account Owners are not Customers of the fund, the industry trend is to subject these accounts to CIP. Accordingly, 529s will be subject to the CIP process unless the client provides instruction not to CIP these accounts. |
|  | 529 Plans - Entity registrant(s) (e.g. scholarship) | No/ Yes* | Entity Account Owner | Data Elements of authorized traders (on application) | Corporate, Partnership or Other, whichever applies - See Documentation Notes | *Although the 529 Account Owners are not Customers of the fund, the industry trend is to subject these accounts to CIP. Accordingly, 529s will be subject to the CIP process unless the client provides instruction not to CIP these accounts. |
|  | Coverdell ESA (formerly Education IRA) | Yes | Individual(s) listed in registration | ---------- |  | Beneficiary (if not the Owner) does not need to be verified upon account opening; beneficiary will be verified when/if account is re-registered in beneficiary's name |
| Other | Medical Savings Account | Yes | Individual |  |  |  |
|  | Qual Interm - Prim WH | Yes | The Intermediary | Data Elements of authorized traders (on application) | Foreign and Other - See Documentation Notes |  |

FIG. 3G3
| | | | |  |  |
|---|---|---|---|---|---|
| Qual Interm - NonPri WH | Yes | The Intermediary | Data Elements of authorized traders (on application) | Foreign and Other - See Documentation Notes | |
| NonQual Intermed | Yes | The Intermediary | Data Elements of authorized traders (on application) | Foreign and Other - See Documentation Notes | |

FIG. 3H

PFPC TA CIP CUSTOMER MATRIX

| Account Category | Account Type | Does CIP Apply? | Who Is Customer? | Information Recommended to be Obtained in Addition to Customer's Required Data Elements | Recommended Documents to be Obtained from Customer When Application Submitted | Comments |
|---|---|---|---|---|---|---|
| | Networking Default | No | | | | Per Treasury Guidance, shareholders are Customers of the B/D, not the fund. |
| | NSCC Default | No | | | | Per Treasury Guidance, shareholders are Customers of the B/D, not the fund. |

*Please refer to documentation notes on next page ***

DOCUMENTATION NOTES:

Corporate Documentation - Certified Copy of any one or more of the following:
1. Certificate of Good Standing [obtained from Secretary of State of the state of incorporation];
2. Articles of Incorporation; or
3. Corporate Resolution

Partnership Documentation - Certified Copy of Partnership Articles or Agreement
Other Documentation - Unless otherwise specified in the matrix, Certified Copy of the Entity's Organizational Documents, such as Articles or Agreement

Documentation of Identification Number other than a U.S.-issued TIN - If the Customer provides an identification number *other than* the Customer must also provide all 3 of the following at the time the
1. The name of the document - e.g., Passport, Non-Resident Alien Registration ("Green Card")
2. The name of the country that issued the document and identification
3. A copy of the document issuing the identification number (Client may want to consider requiring the copy to be certified)

Foreign Customer Documentation:
1. U.S.-issued TIN - The supporting documentation to be obtained from the Customer is the same as for Domestic Customers, as stated in the Matrix and the Documentation Notes above.
2. Identification Number other than a U.S.-issued TIN - The supporting documentation to be obtained from Foreign Customers is the same as for Domestic Customers, as stated in the Documentation.

FIG. 4A1

PFPC TA CIP SCENARIO MATRIX

| Scenario | Description of Activity - on or after 10/1/03 | Data Elements Required? | Explanation |
|---|---|---|---|
| 1 | New Customer to Management Company opens an account | Yes | Customer is opening a new account after effective date of CIP rule |
| 2 | Grandfathered Customer purchasing into a new fund with Management Company | No | New fund positions opened for Grandfathered Customers are excluded from CIP requirement per Treasury/SEC guidance of 8/11/03 |
| 3 | Previously verified (post 10/1/03) Customer purchasing into a new fund with Management Company | No  454 | Data elements would have been collected and verification performed when Customer opened first account on or after 10/1/03 |
| 4 | Grandfathered Customer purchasing into a new fund as part of an exchange | No | New fund positions opened for Grandfathered Customers via exchange are excluded from CIP requirement per Treasury/SEC guidance of 8/11/03 |
| 5 | Previously verified (post 10/1/03) Customer purchasing into a new fund as part of an exchange | No | Data elements would have been collected and verification performed when Customer opened first account on or after 10/1/03 |
| 6 | Adding new Customer to Grandfathered Customer's account | Yes - for both | Both existing Customer and added Customer need to be CIP'd because legal ownership of account has changed |
| 7 | Removing an existing Customer from a Grandfathered account | Yes - for remaining Customer(s) | Remaining Customer(s) needs to be CIP'd because legal ownership of account has changed |

FIG. 4A2

| A | | B | C |
|---|---|---|---|
| 8 | Adding new Customer to previously verified (post 10/1/03) Customer's account | Yes - for new Customer only | Only additional Customer needs to be CIP'd because data elements would have been collected and verification performed when existing Customer opened first account on or after 10/1/03 |
| 9 | Maintenance of any of data elements for Grandfathered Customer | No | No CIP requirement for maintenances; will only verify if requested by client |
| 10 | Maintenance of any of data elements for previously verified (post 10/1/03) Customer | No | No CIP requirement for maintenances; will only verify if requested by client |

FIG. 4B1

PFPC TA CIP SCENARIO MATRIX

| Scenario | Description of Activity - on or after 10/1/03 | Data Elements Required? | Explanation |
|---|---|---|---|
| 11 | Customer changes name due to marriage | No | No change in account ownership. Whether or not new account number is established by name change is irrelevant |
| 12 | New account established via NSCC - all networking levels | No | Shareholder is not a Customer of the fund per Treasury/SEC guidance of 8/11/03 |
| 13 | New account established via ImpressNET for new Customer to the management company | Yes | New Customer is opening an account after effective date of CIP rule |
| 14 | New fund position within existing account is established through ImpressNET via purchase or exchange | No | New fund positions established for Grandfathered customers are excluded per Treasury/SEC guidance of 8/11/03; For other Customers, data elements would have been collected and verification process performed (if required) when opened first account on/after 10/1/03 |
| 15 | New fund position established via a share class flip | No | Not shareholder initiated |
| 16 | New account established via acquisition, merger, purchase of assets, or assumption of liabilities from any third party | No | Rule specifically excludes from CIP requirement |
| 17 | New account established via TA conversion | No | Previous TA would have performed CIP and/or fund would represent to PFPC that CIP was done and/or account is Grandfathered |

FIG. 4B2

| | A | B | C |
|---|---|---|---|
| 18 | New fund position established as a result of systematic exchange, asset reallocation/portfolio rebalancing, or cross-fund reinvestment | No | New fund positions established for Grandfathered customers are excluded per Treasury/SEC guidance of 8/11/03; For other Customers, data elements would have been collected and verification process performed (if required) when opened first account on/after 10/11/03 |
| 19 | Subsequent purchase or exchange via DAZL | No | DAZL does not establish new accounts on TA system; data elements would have been collected and CIP would have been performed (if required) when the new/exchange 'to' position/account was established on the TA system |

PFPC TA CIP SCENARIO MATRIX

FIG. 4C1

| Scenario | Description of Activity - on or after 10/1/03 | Data Elements Required? | Explanation |
|---|---|---|---|
| 20 | Purchase into new fund via exchange through VRU | No | New fund positions established for Grandfathered customers are excluded per Treasury/SEC guidance of 8/11/03; For other Customers, data elements would have been collected and verification process performed (if required) when opened first account on/after 10/1/03 |
| 21 | Minor on UGMA account reaches age of majority and transfers assets into account in own name | Yes | Minor was excluded from CIP in beneficiary capacity, but when opens account as new Customer, CIP requirements will apply |
| 22 | IRA beneficiary transfers assets into account in own name | Yes | Beneficiary was excluded from CIP in beneficiary capacity, but when opens account as new Customer, CIP requirements will apply |
| 23 | TOD beneficiary transfers assets into account in own name | Yes | Beneficiary was excluded from CIP in beneficiary capacity, but when opens account as new Customer, CIP requirements will apply |
| 24 | New fund position established as result of 529 portfolio model auto-re-balancing | No | New fund positions established for Grandfathered customers are excluded per Treasury/SEC guidance of 8/11/03; For other Customers, data elements would have been collected and verification process performed (if required) when opened first account on/after 10/1/03 |
| 25 | Account is opened for a Customer on/after 10/1/03 but for which there is an "as of" trade date prior to 10/1/03 | No | Trade date is date of actual account opening so these Customers should be Grandfathered. Operations will identify these situations manually and set appropriately in system so information is not extracted for verification |

FIG. 4C2

| A | | B | C |
|---|---|---|---|
| 26 | Account is reregistered out of dealer omnibus position into direct client named position via letter of instruction from dealer | No | Dealer is seeking to open account |
| 27 | Account is reregistered out of a dealer networked account into a direct client named position via a letter of instruction from dealer | No | Dealer is seeking to open account |

FIG. 4D

PFPC TA CIP SCENARIO MATRIX

| Scenario | Description of Activity - on or after 10/1/03 | Data Elements Required? | Explanation |
|---|---|---|---|
| 28 | Grandfathered Customer with retail account establishes a new Non-ERISA Retirement (e.g. IRA) position in the fund complex | Yes | Customer is establishing a new registration but has not already been CIP'd by the Fund |
| 29 | Previously verified (post 10/1/03) Customer with retail account establishes a new Non-ERISA Retirement (e.g. IRA) position in the fund complex | No | Account owner is already an existing Customer of the fund complex and has previously been CIP'd |
| 30 | Grandfathered Customer does a full redemption, but then sends a subsequent investment back into their existing registration | No | Account would still be considered grandfathered as long as it has not been purged per the standing instructions of the Fund |
| 31 | Previously verified (post 10/1/03) Customer does a full redemption, but then sends a subsequent investment back into their existing registration | No | Account owner is already an existing Customer of the fund complex and has previously been CIP'd |

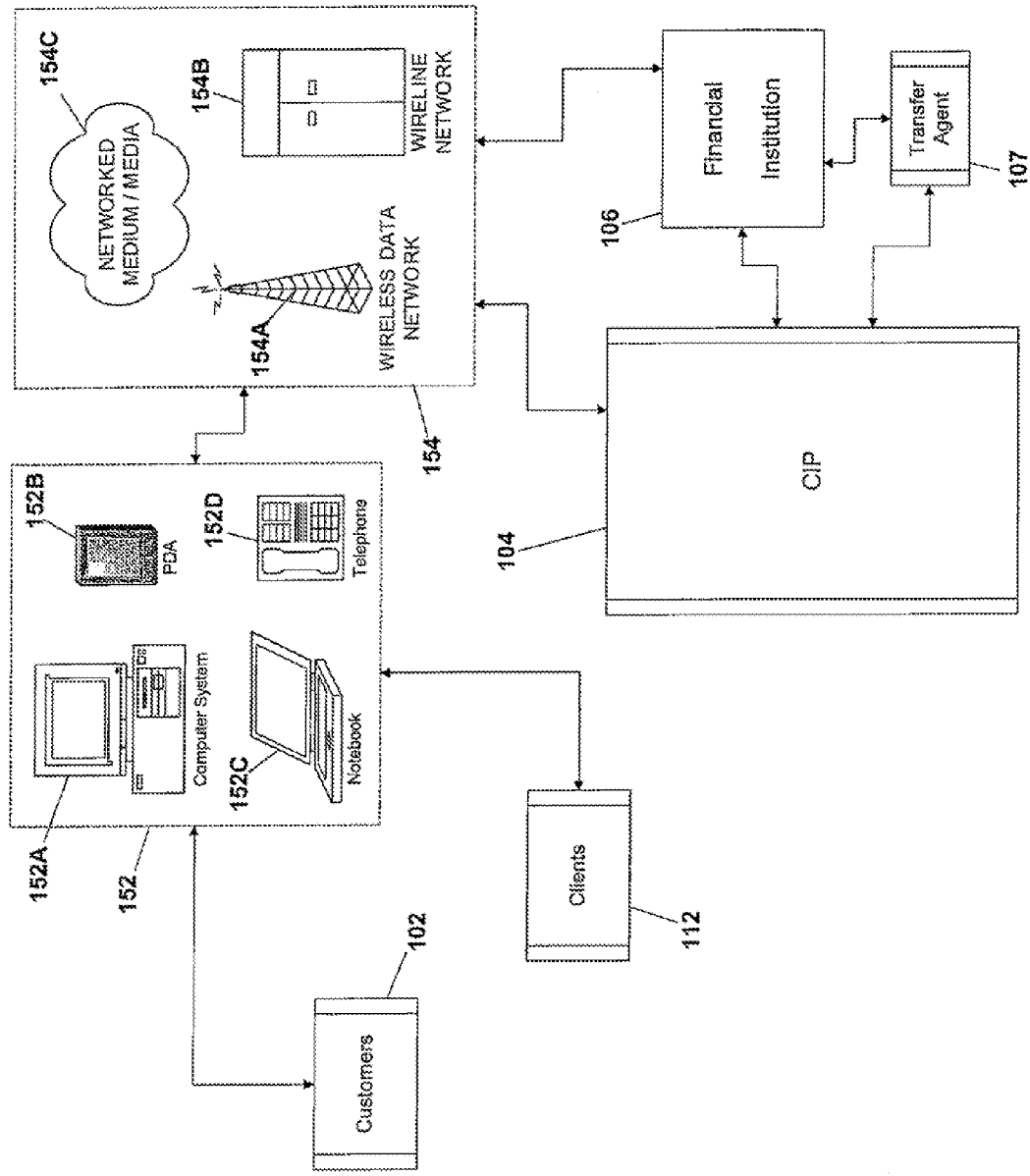

```
┌─────────────────────────────────────────────────────────────────┐
│ ▣ FRS - EXTRA! PERSONAL CLIENT                           □□□    │
│ □□□□□□□□□□□□□                                                   │
│   PT47              PAT INQUIRY SERVICE SYSTEM         3:12 PM  │
│                     CUSTOMER CONTACT INQUIRY/ENTRY              │
│                                                                 │
│            ENTER APPROPRIATE DATA AND PRESS ENTER:              │
│                                                                 │
│              PAT REFERENCE --  [      ]  [          ]           │
│                                                                 │
│              [-- OR --]                                         │
│                                                                 │
│              BANK NUMBER  ---- ┐                                │
│              ACCOUNT TYPE ---- │                                │
│              ACCOUNT NUMBER    └──────────────────────┐         │
│                                                                 │
│              [-- OR --]                                         │
│                                                                 │
│              CUSTOMER SSN TIN  [          ]                     │
│                                                                 │
│                                                                 │
│   F1=HELP                                              F12=EXIT │
│  [4 B ▮]      ⊙ :00.1                                    08/36  │
└─────────────────────────────────────────────────────────────────┘
```

```
FRS - EXTRA! PERSONAL CLIENT

PAT CONTACTS BOOKING REVIEW              3 : 44 PM
CNTCS BY :                                              TOTAL:
ORIG UNIT :                        RSLVD :
ASSIGNED :                         FROM :         TO :
 #        UNIT    CNF   CSR/ASSIGNEE       STD  BUS  CAL

SELECT RECORD    TO VIEW CONTACT DETAIL
F1=HELP              F3=EXIT     ?=FLD OPTS
PLEASE  ENTER DATA OR PRESS PF KEY
 4 B         :00.1                                        03/13
```

```
┌─────────────────────────────────────────────────────┐
│ ▣FRS - EXTRA! PERSONAL CLIENT                    □ □│
├─────────────────────────────────────────────────────┤
│ □□□□□□□□□□□□□□□                                     │
│                    PATFM002              03 : 47 : 57│
│   REFERENCE NUMBER    032720076831                  │
│   SOURCE ID           PNC CIFNA                     │
│   FOREIGN KEY         HAPMO1J4F001                  │
│   RESOLVED INDICATOR                                │
│   CUST NAME                                         │
│   SSN TIN                                           │
│   ADDR LINE 1                                       │
│   ADDR LINE 2                                       │
│   ADDR LINE 3                                       │
│   CITY                                              │
│   STATE                      ZIP CODE               │
│   COUNTRY                                           │
│   OFAC NAME ADDR LINE 1    HAROON                   │
│   OFAC NAME ADDR LINE 2    - 0 -                    │
│   OFAC NAME ADDR LINE 3    - 0 -                    │
│   OFAC NAME ADDR LINE 4    - 0 -                    │
│   OFAC NAME ADDR LINE 5                             │
│   OFAC NAME ADDR LINE 6                             │
│   INFO AREA 1              - 0 -                    │
│   INFO AREA 2              DOE 25 AUG 1992. ALT. DOE 25 DEC 1974.ALT. DO│
│                                                     │
│   F1 : HELP:   F3 : SAVE & EXIT:  F12 : CANCEL:  ? : OPTS:│
│  ┌──┐   ┌─┐                                         │
│  │4 B│  │ :00.1                               02/26 │
└─────────────────────────────────────────────────────┘
```

*FIG. 10*

MUTUAL FUND CUSTOMER IDENTIFICATION

CROSS-REFERENCE TO RELATED APPLICATIONS/PRIORITY CLAIM

The present patent application is a continuation of co-pending U.S. patent application Ser. No. 12/117,387, filed on May 8, 2008, which is a continuation of U.S. patent application Ser. No. 11/237,331, filed on Sep. 28, 2005, which claims the priority of U.S. Provisional Patent Application Ser. No. 60/613,672, which was filed on Sep. 28, 2004. All of the foregoing applications are hereby incorporated by reference into the present application.

FIELD OF THE INVENTION

The present invention generally relates to collecting, analyzing and other processing of data to verify the identities of customers of a financial institution such as a mutual fund.

BACKGROUND

Historically, mutual funds have not possessed specific information about the identities of their individual customers, nor have they verified the identities of their customers. Mutual funds typically do not interact directly with their customers, often instead employing transfer agents to receive, review and process documents such as applications for new accounts. It can be appreciated that this way of doing business in the financial industry has created a high degree of anonymity between mutual funds and their customers.

In association with enactment of the USA PATRIOT Act ("Patriot Act"), the Treasury Department and the Securities and Exchange Commission were directed to develop rules and regulations for implementing customer identification programs ("UP") to address the need to verify the identities of customers of financial institutions such as mutual funds. To satisfy the requirements of the Patriot Act, mutual funds and other financial entities have been mandated to establish and execute such CIPs in their business operations. A properly administered CIP requires financial institutions to undertake "reasonable procedures" for verifying the identities of their customers, to maintain customer verification records, and to compare customer information against certain government lists (e.g., government lists of known terrorists). It can be seen that enactment of the Patriot Act has forced a fundamental change in the nature of the relationship between mutual funds and their customers and how mutual funds must conduct business.

In view of the compliance issues arising from this regulatory environment, effective and efficient processes are needed for obtaining, processing and storing identifying information for customers of financial institutions, including mutual funds.

BRIEF DESCRIPTION OF THE FIGURES

The utility of the embodiments of the invention will be readily appreciated and understood from consideration of the following description of the embodiments of the invention when viewed in connection with the accompanying drawings.

FIG. 2 includes a process flow diagram illustrating aspects of customer identification processes that may be provided in accordance with embodiments of the present invention;

FIGS. 3A through 3H include an illustration of a sample customer matrix;

FIGS. 4A through 4D include an illustration of a sample scenario matrix;

FIG. 5 includes a system architecture diagram illustrating additional embodiments that may be provided in accordance with the system of FIG. 1; and, FIGS. 6 through 10 include sample screen displays that may be employed by embodiments of a compliance database provided in accordance with embodiments of the present invention.

DESCRIPTION

As applied herein, the term "CIP" represents "Customer Identification Program" and may be employed to identify a variety of methods, systems, apparatus and/or computer products or computer-readable media provided in accordance with various embodiments of the present invention. A CIP may be employed to obtain, analyze, and/or store identifying data associated with various customers of a financial institution with respect to requirements of the Patriot Act, for example.

As used herein, the term "financial institution" is defined in accordance with the Patriot Act and all of its applicable amendments, revisions, and provisions. A "financial institution" may also be any entity that performs compliance activities in accordance with the Patriot Act, either by itself or through cooperation with another entity (e.g., a third party service provider). A "mutual fund" is one example of a financial institution, and the term "mutual fund" or "fund" may be employed illustratively at times herein to represent a "financial institution" in a generic sense.

As used herein, the term "customer" may be any person or entity for whom identifying data is collected and processed in accordance with various embodiments of the invention. A "customer" may be the person that opens an account in a mutual fund, for example, or a new registered owner of a shareholder account held with a financial institution.

Figure 1:
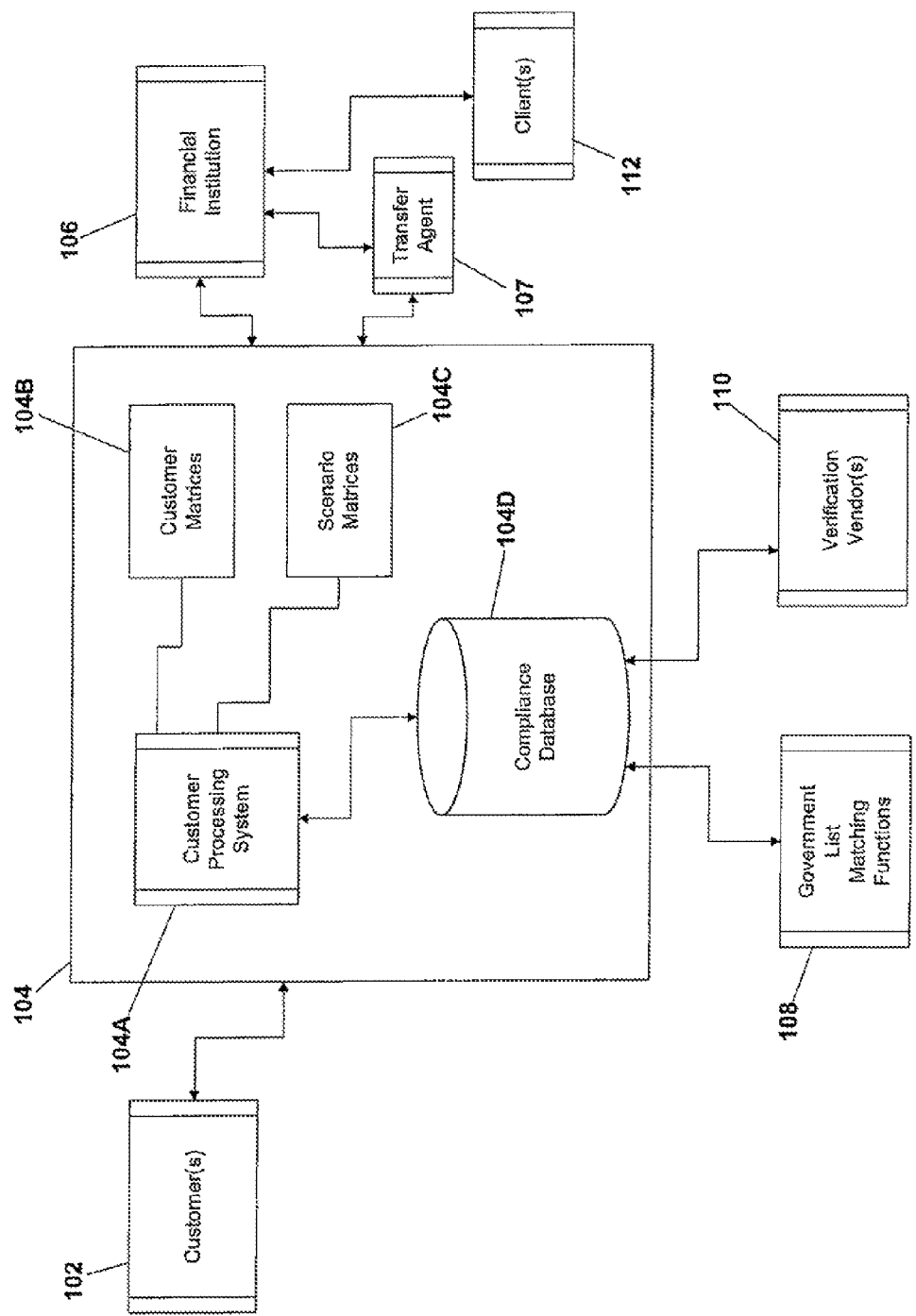
FIG. 1 includes a system architecture diagram illustrating aspects of a system that may be provided in accordance with embodiments of the present invention.

Referring now to FIGS. 1 and 2, exemplary aspects of a compliance workflow and system architecture that can be configured and employed in accordance with embodiments of the present invention are illustrated. As shown, at step 202, one or more customers 102 can communicate identifying data which is received by a customer processing system 104A of a customer identification program ("CIP") 104 maintained and operated by a financial institution 106. The customers 102 may be shareholders seeking to initiate and maintain investment accounts with the financial institution 106, for example. As discussed in more detail herein, the CIP 104 allows the financial institution 106 (and/or the financial institution 106 operating through or in cooperation with a transfer agent 107) to perform risk-based analyses in association with compliance with relevant portions of the Patriot Act, for example, including verifying the identity of each new customer who opens an account with the financial institution 106. The financial institution 106 may be a mutual fund, for example, or a third party entity that has been engaged to provide CIP services on behalf of a mutual fund. The financial institution 106 may be a transfer agent, for example, that a mutual fund has employed to provide CIP services. The transfer agent may provide CIP services in addition to performing recordkeeping functions for the mutual fund.

The customer processing system 104A may be operatively associated with one or more computer systems, for example, that facilitate the collection and processing of identifying data or other information received from the customers 102. The customer processing system 104A may include a transfer agent recordkeeping system and/or imaging system, for example, configured with one or more functions that assist with one or more of the following processes: (1) defining who the customer 102 is in each type of account that might be operated by the financial institution 106; (2) determining which customers 102 need to be verified and which do not have to be verified in accordance with Patriot Act requirements; (3) and/or, if the customer 102 has to be verified, identifying what entity involved in the relationship with the financial institution 106 should be deemed the customer 102, especially if a corporation, trust, retirement plan or other such business entity is involved. The identifying data obtained by the customer processing system 104A from the customers 102 in step 202 may include, without limitation, name, street address, government-issued identification number (e.g., social security number ("SSN") or tax identification number ("TIN")), date of birth (with respect to individuals), and/or a variety of other kinds of identifying data. Also, various supporting documentation may be requested from the customers 102 and received by the customer processing system 104A at step 204 in connection with execution of the CIP 104 by the financial institution 106.

To assist in execution of the CIP 104, various embodiments of the invention may employ one or more customer matrices 104B (at step 206) and/or one or more scenario matrices 104C (at step 208). Aspects of an exemplary customer matrix 104B are illustrated in FIGS. 3A through 3H; and, aspects of an exemplary scenario matrix 104C are illustrated in FIGS. 4A through 4D. It can be appreciated that the matrices 104B, 104C can be employed in association with gathering and analyzing identifying data from the customers 102 including certain required data elements such as government-issued identification including SSN and TIN information, for example, that may be necessary for Patriot Act compliance. The matrices 104B, 104C are structured to account for multiple permutations that may arise during the operation of the customer processing system 104A in receiving and processing new customer 102 information. The matrices 104B, 104C may be embodied and executed in computer software or other suitable computer-readable media configured to operate in association with the customer processing system 104A for analyzing identifying data and/or other information received from the customers 102.

As shown in FIGS. 3A through 3H, the customer matrix 104B provides a tool for determining whether the CIP 104 is applicable to various customers 102; and, if the CIP 104 applies, who the customer 102 is in the relationship with the financial institution 106, what information is required from the customer 102, and/or what supporting documentation should be obtained from the customer 102. In the example shown, the customer matrix 104B may be organized by account category 302 and account type 304 and provide an indication 306 of whether or not the CIP 104 applies to the customer 102, as well as an indication 308 of who should be the customer 102. The customer matrix 104B may also include a section 310 for identifying data to be obtained in addition to predefined necessary data elements such as name, address, SSN/TIN, and date of birth information; a section 312 for designating supporting documentation to be obtained from customers 102 when a new account application is submitted, for example; and, a section 314 for additional comments that may be employed in association with evaluating applicability or treatment of a given account category 302 and account type 304 with respect to the CIP 104.

For example, with reference to line 350 of FIG. 3A, a "businesses" account category 302 and a "partnership" account type 304 illustrate application of the customer matrix 104B to a customer 102 interacting with the financial institution 106. In this example, the matrix 104B indicates in section 306 that the CIP 104 applies; in section 308 that the customer 102 is "the partnership"; and, in section 310, that information to obtain from the customer 102 includes "data elements of the general partners." The customer matrix 104B also indicates, in section 312 for purposes of this example, that a certified copy of the partnership articles or agreement should be obtained from the customer (see reference to "documentation notes" in section 312, which cross-references information shown in FIG. 3H). The matrix 104B further indicates in section 314 that, "verification of general partners may be performed" by the financial institution 106 in association with the processing activity of the CIP 104.

In addition, the scenario matrix 104C can provide guidance for determining CIP 104 applicability under a variety of circumstances associated with customer 102 accounts and/or customer 102 transactions. In the example shown in FIGS. 4A through 4D, the scenario matrix 104C includes a section 402 for explaining a scenario that might be encountered by the CIP 104; a section 404 that indicates whether the required data elements should be obtained for the given scenario; and, a section 406 that explains the reasoning behind the decision built into the matrix 104C to obtain the required data elements. For example, at scenario number 3 of FIG. 4A, application of the scenario matrix 104C provides that the required data elements need not be obtained (see section 454) for a customer previously verified through the CIP 104 after Oct. 1, 2003 (see section 452), because the data elements would have been collected from the customer when the customer first opened an account on or after Oct. 1, 2003 (see section 456).

If the financial institution 106 determines during the identifying data collection process that a customer 102 application does not include the necessary data elements, the financial institution 106 may reestablish contact with the customer 102 or a representative of the customer 102 (e.g., a broker) to obtain the required data elements. It can be seen that, subject to the requirements of the Patriot Act, existing customers 102 of the financial institution 106 may or may not need to be processed through the CIP 104.

With reference to FIG. 5, the customers 102, the financial institution 106, and the clients 112 may communicate with and access the CIP 104 in various ways. These entities 102, 106, 112 may interact with the CIP 104 by using one or more access devices 152 operating through one or more different communication media 154. Examples of access devices 152 include, without limitation, computer systems 152A, personal digital assistants (PDA's) 152B, notebook computers 152C, and/or telephones 152D (of either wireless or wireline variety). Examples of communication media 154 include, without limitation, wireless data networks 154A, wireline networks 154B, and/or various networked media 154C (e.g., the Internet). Communications conducted by operation of the access devices 152 through the communication media 154 may be secured or encrypted by means of conventional security devices or processes.

Referring again to FIGS. 1 and 2, in various embodiments, the CIP 104 includes a compliance database 104D that assists with the process of conducting verification of customers 102 in accordance with the requirements of the Patriot Act, for example. In general, the compliance database 104D acts as a gatekeeper or common processing point between/among the customer processing system 104A, one or more government list matching functions 108, and one or more verification vendors 110. At step 210, on a periodic or non-periodic basis, customer 102 information is collected or extracted from the customer processing system 104A and received in the compliance database 104D, wherein a record for each customer 102 for whom the CIP 104 has identified as requiring verification is created and stored. The compliance database 104D can be configured to maintain physical and/or logical separation of customer 102 data for multiple financial institutions 106 or clients 112 of the financial institution 106. This functionality enables the CIP 104 to maintain records at the customer 102 level, rather than merely at the shareholder account level, for example.

As discussed in more detail below, the compliance database 104D stores verification results records obtained from the government list matching functions 108, and processing through use of the verification vendors 110. The compliance database 104D can be configured to store required identification information provided by each new customer 102, the verification method or methods used, the results of each verification method, and/or the resolution of any substantive discrepancies discovered during the identity verification process. In addition, electronic images of new account applications and supporting documentation can be stored in an imaging system operatively associated with the customer processing system 104A and/or in the database 104D. Storage of database records and document images can address record-keeping requirements relating to information relied upon by the financial institution 106 in connection with verifying identifying data of customers 102 and confirming the validity of the verification process executed by the CIP 104.

At step 212, the CIP 104 may employ an automated functionality to search records in the compliance database 104D with one or more of the government list functions 108 to determine if customer 102 data appears on a government list of known or suspected terrorists or terrorist organizations. For example, the customer data may be compared against the Office of Foreign Assets Control's lists of Specially Designated Nationals and sanctioned countries to determine if matches or potential matches exist. The financial institution 106 may take appropriate action, including blocking an account and/or notifying its clients 112 of any confirmed matches arising from use of the government list matching functions 108.

At step 214, data may be extracted from the compliance database 104D for unverified customers and communicated electronically to the verification vendors 110. In various embodiments of the invention, a first vendor 110 may be used for individual customers 102 and a second vendor 110 may be used for entity customers 102. An example of a vendor 110 used for individual customers is "Acxiom"; and an example of a vendor 110 used for entity type customers 102 is "Dun & Bradstreet". The CIP 104 of the present invention thus may utilize different vendors for individuals and entities, leveraging these different vendors areas of expertise with customer 102 data. In general, the verification vendors 110 compare the customer 102 data received from the compliance database 104D against their records in step 216 to determine the degree to which the data from the database 104D matches their vendor 110 data. This matching of the database 104D data against the vendor 110 data can be performed in an electronic, non-documentary manner.

Once processing of the customer 102 data by the vendors 110 is completed, the verification vendors 110 may transmit the processed customer 102 records back to the compliance database 104D in step 218 with an indication of the degree to which the database data matches the vendor 110 data. This verification vendor 110 transmission may update the customer 102 records in the compliance database 104D with additional data concerning the verification status of the data, such as an indication of verification pass/fail and/or a verification score, for example. Based on the degree to which the data is matched, as determined by application of predetermined criteria, the CIP 104 may mark the customer's 102 identity data in step 220 as verified or not verified. Customer records not marked as verified may then be placed in one or more queues within the compliance database 104D in step 222 for further verification processing in step 224. In various embodiments, the customer 102 data returned from the vendors 110 that cannot be marked as verified may be electronically re-transmitted to one or more additional vendors 110, for example, for further processing substantially similar to the vendor 110 processing of step 214.

For further verification processing of unverified customer 102 records in step 224, the financial institution 106 may employ one or more identity verification tools provided by the verification vendors 110 to determine if the vendor 110 has sufficient information to enable the financial institution 106 to verify the identifying data of the customer 102. The further verification processing of step 224 may also involve direct contact (e.g., e-mails, telephone calls, etc.) by the financial institution 106 with the customer 102 to attempt to form a reasonable belief that the identity of the customer 102 can be verified. Personnel of the financial institution 106 may also perform a variety of other research functions as part of the further verification processing activity to attempt to verify the unverified customer 102 records in the compliance database 104D.

If the further verification processing is successful at verifying the identity of the customer 102, then the customer 102 record in the compliance database 104D can be updated accordingly at step 226. If the further verification processing is unsuccessful at verifying the identity of the customer 102, however, then a CIP case can be created for the customer 102 record at step 228. The results of the further verification processing efforts may be input into the compliance database 104D at step 226 and retained for future reference in compliance with applicable record keeping requirements of the Patriot Act. When the CIP 104 is unable to verify the identifying data of a customer 102, a resolution code may be placed on the account or accounts associated with the customer 102 at step 226 that prevents future activity by the customer 102 (e.g., investments or exchanges between fund portfolios) with the financial institution 106. The customer 102 or a representative of the customer 102 may be notified of this action. In certain circumstances, additional action may be taken relative to a CIP case, such as closing the account of the customer 102.

The following description includes examples of various aspects of the compliance database 104D to illustrate how it may be employed within the CIP 104 to assist with verifying customer 102 identifying data. These examples are intended to illustrate possible embodiments of the present invention for those skilled in the art and are not necessarily intended to limit the scope of the present invention.

Figure 6:
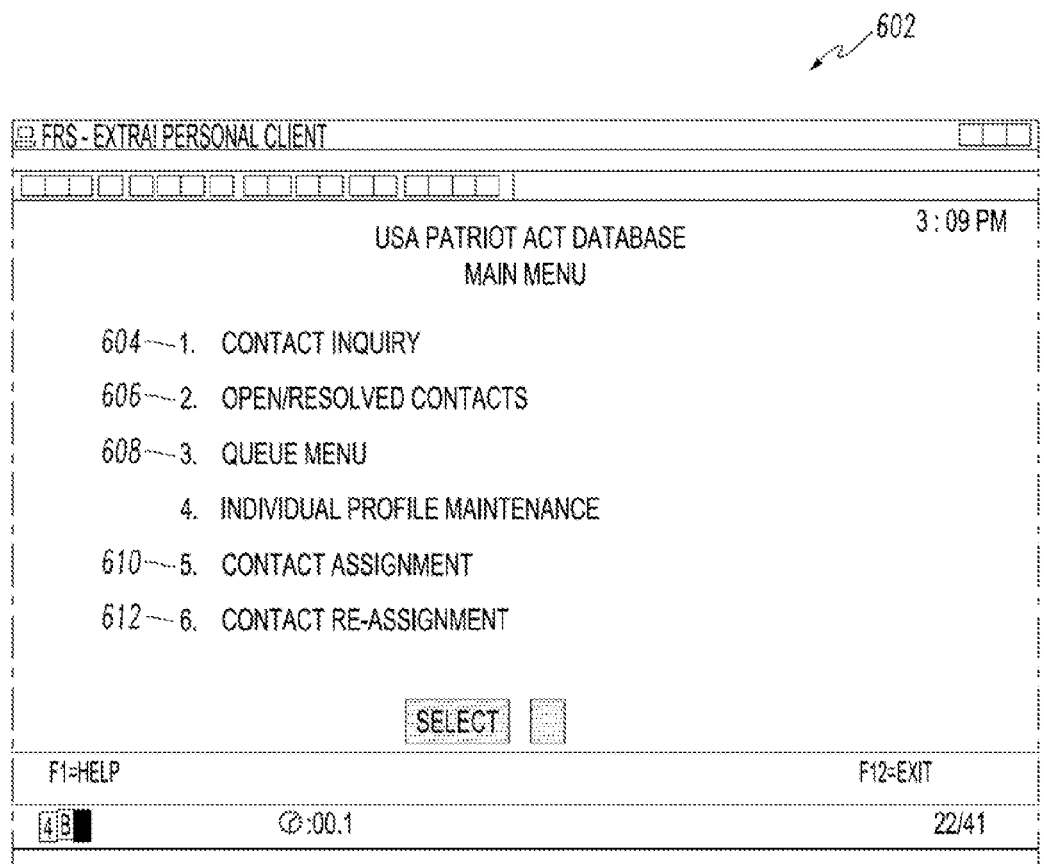

Referring now to FIG. 6, a main menu screen display 602 can be accessed by a user of the compliance database 104D. The main menu screen display 602 includes links to various functions that can be performed within the compliance database 104D. A "Contact Inquiry" function 604 can be used to access specific customer 102 records. An "Open/Resolved Contacts" function 606 can be accessed to view a list of customer 102 records by resolution code, or by their verified or unverified status. A "Queue Menu" function 608 provides a list of work queues, such as a work queue that includes unverified customer 102 records that require further verification processing. Also, a "Contact Assignment" function 610 and a "Contact Re-Assignment" function 612 permit assignment or re-assignment of customer 102 records for further verification processing by specific users of the compliance database 104D. It can be seen that the compliance database 104D provides work queue capability whereby customer 102 records can be assigned to specific users based on various criteria such as by a particular client of the financial institution 106 or by predetermined priority values assigned to the customer 102 records.

Referring now to FIG. 7, an inquiry screen display 702 provides the ability for database 104D users to access customer 102 records for either inquiry or maintenance purposes. Inquiries may be performed by compliance database 104D reference number 704, by bank number 706, by account type 708, and/or by account number 710. Once an inquiry is submitted, either a results list can be displayed (from which a specific customer 102 record could be selected), or the selected customer 102 record details can be displayed.

As shown in FIG. 8, a screen display 802 provides the ability for users to access and work a list of open and resolved items to which they have been assigned. Functions associated with this screen display 802 allow the user to perform a detailed selection/sort of customer 102 records by certain criteria such as by user, by financial institution 106 or client 112, by assigned or unassigned, by resolution code, or by a date/time range. The detailed selection/sort criteria can be configured to default to assigned/open work items in priority order, then by date within priority for that user. Once search results are returned, the user may enter the number corresponding to the record to be reviewed and begin working through assigned items. Any individual criterion or combination of the selection criteria may be selected, resulting in a summary listing of all customer 102 records that meet the criteria. For example, an "Open Items" search may yield a list that represents a particular user's work queue, including customer 102 records that are to be researched and resolved as part of further verification processing. It can be seen that the compliance database 104D permits users to access current open items as well as a list of previously resolved items associated with verification of customer 102 records. Users can also update open items with results of research and/or update the status of the item as part of further verification processing activity.

Figure 9:
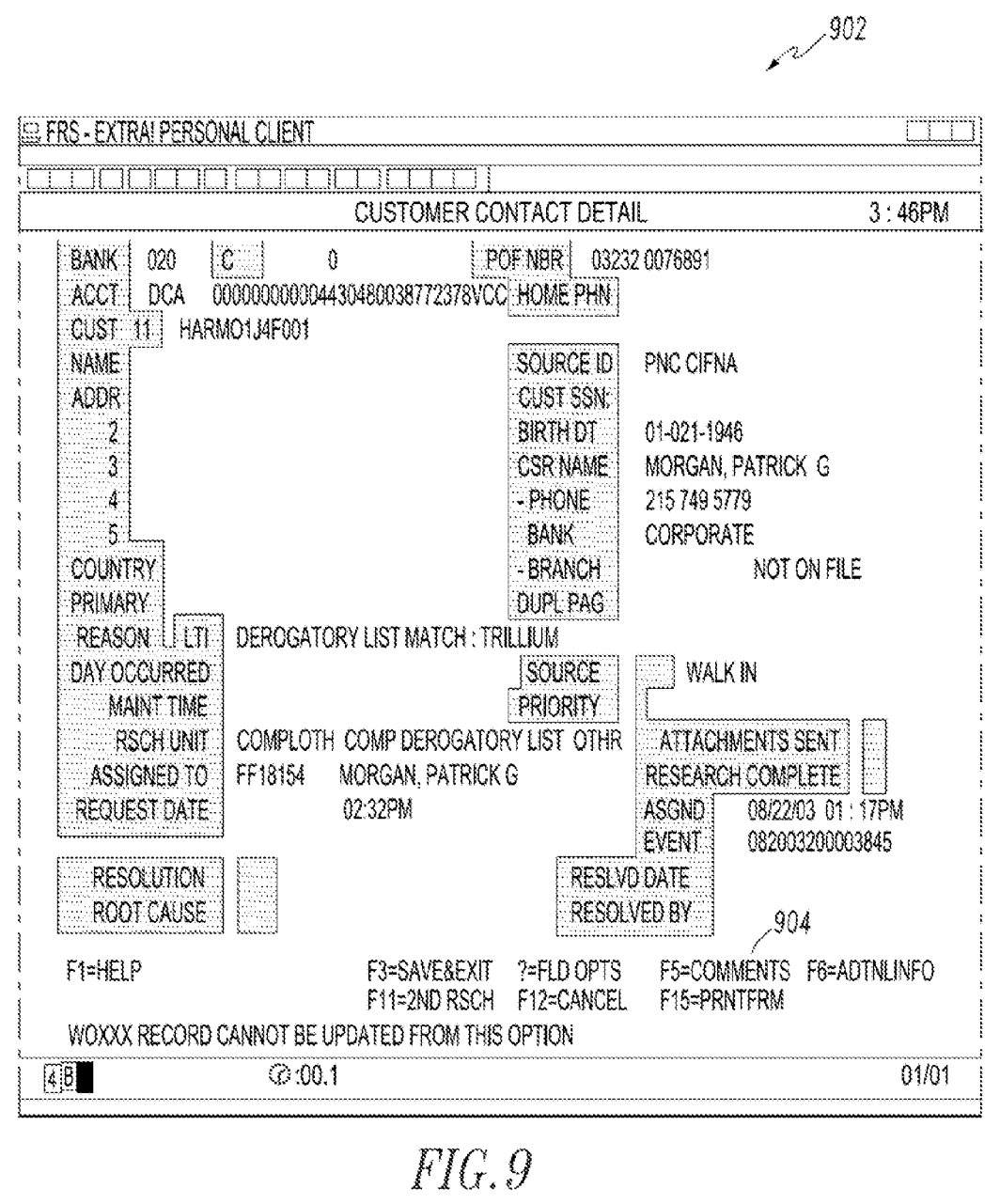

Once a record has been selected, detailed customer 102 record information can be displayed as shown in the screen display 902 of FIG. 9. This screen display 902 may include customer 102 CIP data and verification data. In addition to the fields provided in the detail record screen display 902, the user can also enter free-form text into a comments section 904 associated with the screen display 902. Such comments may reflect the results of further verification processing activity performed in association with one or more customer 102 records.

Referring now to FIG. 10, additional data including vendor 110 data can be provided on a screen display 1002. This screen display 1002 may include address information or scoring data, for example, obtained from one or more of the verification vendors 110. In operation of the compliance database 104B, a priority of a customer 102 record can be set automatically when the record is received from the vendor 110 based on a score applied by the vendor 110. Priority of customer 102 records can also be established based on various factors, including whether the customer 102 is an entity or individual, whether a match with a government list 108 exists, or what financial institution 106 and/or client 112 may be associated with the customer 102 record. One or more work queues of the compliance database 104D can be configured to sort customer 102 records automatically by priority. The queuing process allows for queue criteria to be determined at the client level, or on an individual financial institution 106 or client 112 basis. For example, a given financial institution 106 may desire to create a queue of records deemed to be high-priority items that have achieved a threshold vendor 110 score. It can be seen that prioritized customer 102 records can be readily split into multiple populations of records that are subject to further verification processing in accordance with their priority. In various embodiments, customer 102 records transmitted from the vendors 110 having achieved a predetermined vendor score level may be automatically deemed resolved or verified by the CIP 104. Scores provided by the vendors 110 that summarize degree of similarity between components of the customer 102 record supplied by the compliance database 104D and the vendor 110 reference information may be mapped to confidence intervals (e.g., on a 1-10 scale) that indicate the confidence of the vendor 110 that its reference information matches the customer 102 record.

In various embodiments, one or more of the following criteria may be used by the verification vendors 110 in the identity verification process: name and address match; name and social security number match; social security number is valid; social security number has not been reported as deceased; and/or, number of individuals associated with the social security number is not greater than a predefined threshold. If any of the foregoing criteria is not met, then a customer 102 record may be deemed to be a CIP case that is stored in a work queue in the compliance database 104D. If all of the criteria are met, then the customer 102 record may be deemed to be verified by the vendor 110, and the record can be automatically updated in the compliance database 104D as resolved.

If a customer 102 record cannot be verified, further verification processing may be conducted to confirm whether or not a manual data entry error, for example, has contributed to the failure to verify the customer 102 record. Personnel of the financial institution 106 can review the information returned by the vendor 110 that explains why the customer 102 record has failed the vendor 110 verification process (e.g., name and address do not match). In connection with this review, original source documents received from the customer 102 and stored in the compliance database 104D may be viewed to determine potential causes for the failure to verify the customer 102 record.

In various embodiments of the invention, one or more reports can be generated based on statistical data obtained from operation of the CIP 104. Such reports may include data associated with customers 102 that failed the verification process, customers 102 that the financial institution 106 was able to subsequently verify during further verification processing, accounts on which a stop purchase/credit code has been placed due to failure of verification, and/or other statistical data.

It can be seen that embodiments of the present invention may be structured to support functions performed by a record keeper, such as a mutual fund transfer agent, for example, who has responsibility for processing new accounts on behalf of a mutual fund that has a CIP requirement. In addition to supporting CIP requirements, however, the CIP 104 including the compliance database 104D may also be used in connection with anti-money laundering and/or fraud detection programs.

The examples presented herein are intended to illustrate potential and specific implementations of the present invention. It can be appreciated that the examples are intended primarily for purposes of illustration of the invention for those skilled in the art. No particular aspect or aspects of the examples is/are intended to limit the scope of the present invention.

It is to be understood that the figures and descriptions of the present invention have been simplified to illustrate elements that are relevant for a clear understanding of the present invention, while eliminating, for purposes of clarity, other elements. For example, certain operating system details and modules of network platforms are not described herein. Those of ordinary skill in the art will recognize, however, that these and other elements may be desirable in a typical computer system or database system. However, because such elements are well known in the art and because they do not facilitate a better understanding of the present invention, a discussion of such elements is not provided herein.

Any element expressed herein as a means for performing a specified function is to encompass any way of performing that function including, for example, a combination of elements that perform that function. Furthermore the invention, as defined by such means-plus-function claims, resides in the fact that the functionalities provided by the various recited means are combined and brought together in a manner as defined by the appended claims. Therefore, any means that can provide such functionalities may be considered equivalents to the means shown herein.

In general, it will be apparent to one of ordinary skill in the art that some of the embodiments as described hereinabove may be implemented in many different embodiments of software, firmware, and/or hardware. The software code or specialized control hardware used to implement some of the present embodiments is not limiting of the present invention. For example, the embodiments described hereinabove may be implemented in computer software using any suitable computer software language type such as, for example, C or C++ using, for example, conventional or object-oriented techniques. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the present embodiments may be executed by programmable equipment, such as computers. Software that may cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable medium. Such a medium may include any of the forms listed above with respect to storage devices and may further include, for example, a carrier wave modulated, or otherwise manipulated, to convey instructions that may be read, demodulated/decoded and executed by a computer.

It can also be appreciated that certain process aspects described herein may be performed using instructions stored on a computer-readable medium or media that direct a computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. A computer-readable medium may further include one or more data signals transmitted on one or more carrier waves.

A "computer" or "computer system" may be, for example, a wireless or wireline variety of a microcomputer, minicomputer, server, mainframe, laptop, personal data assistant (PDA), wireless e-mail device (e.g., "BlackBerry" trade-designated devices), cellular phone, pager, processor, fax machine, scanner, or any other programmable device configured to transmit and receive data over a network. Computer devices disclosed herein may include memory for storing certain software applications used in obtaining, processing and communicating data. It can be appreciated that such memory may be internal or external to the disclosed embodiments. The memory may also include any means for storing software, including a hard disk, an optical disk, floppy disk, ROM (read only memory), RAM (random access memory), PROM (programmable ROM), EEPROM (electrically erasable PROM), and other computer-readable media.

In various embodiments of the present invention disclosed herein, a single component may be replaced by multiple components, and multiple components may be replaced by a single component, to perform a given function or functions. Except where such substitution would not be operative to practice embodiments of the present invention, such substitution is within the scope of the present invention: Any of the servers described herein, for example, may be replaced by a "server farm" or other grouping of networked servers that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A computer-assisted method for verifying identifying data of a customer of a financial institution, the method comprising:

receiving by a customer processing system of a customer identification program the identifying data of a customer, wherein the customer processing system comprises an electronic computer processor and an electronic data storage device operatively associated with the customer identification program;

determining by the customer processing system the applicability of the customer identification program to a customer, wherein the determining comprises applying the customer identifying data to at least one of a customer matrix or a scenario matrix, wherein:
(a) the customer matrix comprises data identifying who the customer is in relation to the financial institution, information required from the customer, and supporting documentation to obtain from the customer; and
(b) the scenario matrix comprises data including at least one scenario encounterable by the customer identification program, data indicative of obtaining required data elements for a scenario, and data including a reason for obtaining the required data elements;
when the customer identification program is applicable to the customer, determining with the at least one of the customer matrix or the scenario matrix the customer identifying data to be obtained from the customer;
creating a record for the customer in a compliance database of the customer identification program, wherein the compliance database comprises an electronic data storage device operatively associated with the customer processing system;
searching at least one record of the customer identifying data with at least one governmental list function using the customer processing system; and,
communicating by the customer processing system at least one record of the customer identifying data to at least one verification vendor for verification of the customer's identity.

2. The method of claim 1, further comprising verifying the customer identifying data in accordance with at least a portion of the Patriot Act.

3. The method of claim 1, wherein the financial institution includes a mutual fund.

4. The method of claim 1, further comprising engaging a third party entity to provide customer identification program services on behalf of the financial institution.

5. The method of claim 4, wherein the financial institution includes a mutual fund.

6. The method of claim 4, wherein the third party entity includes a transfer agent.

7. The method of claim 1, wherein the identifying data is selected from the group consisting of customer name, customer address, a government-issued identification number, and a date of birth.

8. The method of claim 1, further comprising receiving supporting documentation in the customer processing system.

9. The method of claim 1, further comprising reestablishing contact with the customer to obtain required data elements associated with the customer identifying data.

10. The method of claim 1, further comprising employing at least a first verification vendor for individual customers and a second verification vendor for entity customers.

11. The method of claim 1, further comprising receiving an indication of the degree to which the customer record matches information of the verification vendor.

12. The method of claim 11, further comprising marking at least one of the customer records as verified or unverified.

13. The method of claim 12, further comprising placing the unverified customer records in one or more queues for further verification processing.

14. The method of claim 12, further comprising re-transmitting at least one of the unverified customer records to at least one of the verification vendors.

15. The method of claim 12, further comprising conducting at least one further verification processing activity to attempt to verify at least one of the unverified customer records.

16. The method of claim 15, wherein when the further verification processing activity is unsuccessful at verifying the customer record, creating a CIP case based on the unverified customer record.

17. The method of claim 15, wherein when the further verification processing activity is unsuccessful at verifying the customer record, placing a resolution code on an account of the customer to prevent future activity by the customer with the financial institution.

18. A computer system programmed for verifying identifying data of a customer of a financial institution, the method comprising:
receiving by a customer processing system of a customer identification program the identifying data of a customer, wherein the customer processing system comprises an electronic computer processor and at least one electronic data storage device; and,
wherein the processor is programmed for:
determining applicability of the customer identification program to a customer, wherein the determining comprises applying the customer identifying data to at least one of a customer matrix or a scenario matrix, wherein:
(a) the customer matrix comprises data identifying who the customer is in relation to the financial institution, information required from the customer, and supporting documentation to obtain from the customer;
(b) the scenario matrix comprises data including at least one scenario encounterable by the customer identification program, data indicative of obtaining required data elements for a scenario, and data including a reason for obtaining the required data elements, and
when the customer identification program is applicable to the customer, determining with the at least one of the customer matrix or the scenario matrix the customer identifying data to be obtained from the customer;
creating a record for the customer in a compliance database of the customer identification program, wherein the compliance database comprises an electronic data storage device operatively associated with the customer processing system;
searching at least one record of the customer identifying data with at least one governmental list function using the customer processing system; and,
communicating by the customer processing system at least one record of the customer identifying data to at least one verification vendor for verification of the customer's identity.

* * * * *